United States Patent Office 3,055,733
Patented Sept. 25, 1962

3,055,733
UPGRADING ALKALI METAL SILICOFLUORIDE
Warren H. Lang, Bartow, and Howard P. Gould, Winter Haven, Fla., assignors to Swift & Company, Chicago, Ill., a corporation of Illinois
No Drawing. Filed Mar. 4, 1959, Ser. No. 797,035
7 Claims. (Cl. 23—88)

The present invention relates to a process for manufacturing high-grade alkali metal silicofluoride. More specifically, the invention relates to a process for upgrading alkali metal silicofluoride which has been produced as a by-product in the production of crude phosphoric acid.

In the conventional method of producing crude phosphoric acid from phosphate rock, a weak phosphoric acid containing from approximately 1.6 to 2.4% fluorine, usually present in the form of $H_2SiF_6$, is produced. The fluorine is customarily removed from the crude phosphoric acid by adding a soluble base such as sodium hydroxide or a soluble salt such as sodium carbonate to the phosphoric acid mixture and precipitating a silicofluoride salt. This precipitated salt is filtered off, washed with water, and dried. The dried silicofluoride salt produced has a purity of from about 94–97%. One major outlet for the salt is the water fluoridation field; however, persons using sodium silicofluoride in water fluoridation require a salt having a purity of at least 98%. Therefore, the salt produced by the above method is not sufficiently pure to enable it to be used for such purposes as water fluoridation.

It is an object of this invention to provide a process for producing a silicofluoride salt having a purity of at least 98%.

Another object is to recover fluorine contained in weak phosphoric acid produced by the wet method, as sodium silicofluoride having a purity of at least 98%.

Additional objects and advantages of this invention, if not specifically set forth, will become apparent to one skilled in the art during the course of the following description.

Broadly, this invention comprises subjecting an alkali metal silicofluoride, which has been recovered as a by-product from crude phosphoric acid, to a hot digesting step with hydrofluosilicic acid. The hot slurry is filtered, the silicofluoride salt is water-washed free of any liquid impurities, and the wet salt cake is dried and bagged. Silicofluoride salt which has been treated by this hot digestion step has a purity of at least 98% and is acceptable for use in water fluoridation.

In one of the conventional methods of manufacturing crude phosphoric acid by the wet method, phosphate rock is ground and premixed with weak phosphoric acid to form a slurry. The ground phosphate rock and weak phosphoric acid slurry are introduced into reactors, sulfuric acid is added and the slurry is agitated and cooled with large volumes of air. The slurry is pumped to filters where phosphoric acid containing 25 to 33% $P_2O_5$ is separated from the calcium sulfate precipitate which has formed. The calcium sulfate filter cake is washed with dilute phosphoric acid and the filtrate is returned to the head of the system for use in pre-slurrying the ground phosphate rock. The calcium sulfate is further washed with fresh water.

The crude phosphoric acid so separated contains approximately 1.6 to 2.4% fluorine, usually present in the form of hydrofluosilicic acid ($H_2SiF_6$), and the fluosilicate is ordinarily recovered by adding a soluble alkali base or salt, such as sodium or potassium hydroxides or carbonates and similar materials which are referred to in the claims as alkaline precipitating agents or alkali metal precipitating agents, to precipitate alkali metal silicofluoride. In one of the ordinary methods for extracting fluorine from crude phosphoric acid, sodium hydroxide of 25% strength is added to a reactor along with the crude phosphoric acid containing fluorine. About one part by weight of (100%) sodium hydroxide is added to 80 parts by weight of phosphoric acid containing 25 to 33% $P_2O_5$. The sodium hydroxide reacts with the hydrofluosilicic acid to form sodium silicofluoride which is a precipitate. After a reaction time of about 30 minutes the phosphoric acid containing precipitated sodium silicofluoride is placed in a thickener. The clear phosphoric acid is separated from the sodium silicofluoride by drawing the latter off the bottom in slurry form and the clear phosphoric acid is returned to the phosphoric acid plant for subsequent concentration to 54% $P_2O_5$ phosphoric acid. The sodium silicofluoride slurry from the bottom of the thickener is decanted in a spiral classifier, water-washed free of any liquid impurities, and then dried. The purity of the product produced by this method is from about 94–97% sodium silicofluoride.

The present invention is concerned with upgrading the sodium silicofluoride produced as described above. It has been found that if sodium silicofluoride as taken from the spiral classifier is subjected to a hot digestion step with hydrofluosilicic acid, a salt of much higher purity is produced. In one method for upgrading, the sodium silicofluoride as it is taken from the spiral classifier in the form of a slurry with phosphoric acid is placed in a hot digester along with a small amount of hydrofluosilicic acid at a ratio of approximately one part by weight of hydrofluosilicic acid to one part of sodium silicofluoride. The mixture is agitated in the digester at an elevated temperature until digestion is complete. We have found that a digestion for from about 5 to about 10 minutes at temperatures from about 175° F. to about 212° F. will insure optimum results. Obviously, lower temperatures and longer times could be utilized as the digestion rate is a function of the temperature utilized. The hot slurry from the digester is fed to a filter where the sodium silicofluoride salts are water-washed free of any liquid impurities. The wet sodium silicofluoride salts are dried and the product produced has a purity of greater than 98%.

The liquid impurities which are separated from the pure sodium silicofluoride are composed of water, hydrofluosilicic acid, phosphoric acid, and dissolved solids. These impurities may be mixed with the crude phosphoric acid prior to the addition of the soluble sodium salt or base so that any excess $H_2SiF_6$ not utilized in the digestion step may be precipitated as sodium silicofluoride.

Any strength of hydrofluosilicic acid up to about 25% may be utilized in the digestion step; however, we find it convenient to use a weak hydrofluosilicic acid having a strength of from 3–18%. A weak acid of this strength may be obtained from the waste scrubber water of the phosphoric acid manufacturing process. In the manufacturing of phosphoric acid of 25–33% strength as described above, some fluorine is liberated as a $SiF_4$ gas. The stack gases containing $SiF_4$ are water-washed, forming a weak solution of $H_2SiF_6$ having a strength of from 3–18%.

Dry, low grade sodium silicofluoride may also be upgraded to a purity of greater than 98% by subjecting the sodium silicofluoride to a hot digestion with hydrofluosilicic acid. In this digestion step there is no $H_3PO_4$ present, the amounts and strengths of $H_2SiF_6$ and time and temperatures utilized are the same as described in the above method.

The major impurities found in the salt as it comes from the spiral classifier are calcium sulfate, iron, aluminum, and phosphates. The iron and aluminum are probably tied up as phosphates and complexes such as an aluminum fluoride compound. By subjecting the sodium silicofluoride from the spiral classifier to a hot digestion with hydrofluosilicic acid we have discovered that practically all of the calcium sulfate impurity is dissolved; there is also some reduction in the iron, aluminum, and phosphate content. Thus, a very pure, high grade sodium silicofluoride is produced, which is of sufficiently high purity to enable it to be used in water fluoridation processes as well as for other purposes which require sodium silicofluoride having a high purity.

The following examples of the process of this invention are given for the purpose of illustration only. It will be understood the invention is not limited to these examples.

*Example I*

Samples of classifier decant slurry consisting of one part $Na_2SiF_6$ to one part phosphoric acid of 30% $P_2O_5$ strength were mixed with one part of 13% $H_2SiF_6$. This slurry was mixed for five minutes at a temperature of 180° F. After the digestion step, the hot slurry was filtered to remove the sodium silicofluoride crystals. These crystals were then water-washed to remove any liquid impurities and dried. In each case a control test was run on a portion of the classifier decant slurry in which case the salts were water-washed free of all liquid impurities and dried.

The results in the following table show the percent of sodium silicofluoride in the sample as it comes from the classifier (control) and the percent of sodium silicofluoride in the sample after the upgrading process.

| Test Number | Control | After Upgrading |
|---|---|---|
| 1 | 97.15 | 99.04 |
| 2 | 97.28 | 99.16 |
| 3 | 94.14 | 98.80 |

*Example II*

To one part of dry, low grade $Na_2SiF_6$, one part of the particular $H_2SiF_6$ solution was added along with ½ part of phosphoric acid of about 30% $P_2O_5$ strength (the phosphoric acid was added to simulate fresh $Na_2SiF_6$ slurry coming from the spiral classifier of the hot digester). This slurry was heated to 180° F. and mixed at this temperature for five minutes. The results in the following table show the percent of $Na_2SiF_6$ obtained using different percentages of $H_2SiF_6$.

| Strength of $H_2SiF_6$, percent | Grade of Original Product | Grade of Upgraded Product |
|---|---|---|
| 3 | 95.47 | 98.34 |
| 5 | 95.47 | 98.37 |
| 7½ | 95.47 | 98.34 |
| 10 | 95.47 | 98.67 |
| 18.56 | 96.58 | 98.28 |

*Example III*

To one part of dry, low grade $Na_2SiF_6$, one part of 8% $H_2SiF_6$ solution was added along with ½ part of phosphoric acid of about 30% $P_2O_5$ content (the phosphoric acid was added to simulate fresh $Na_2SiF_6$ slurry coming off the spiral classifier to the hot digester). The results in the following table show the percent of $Na_2SiF_6$ for various temperatures and time periods.

| Grade of Original Product | Grade of Upgraded Product | Mixing Time | Temperature, °F. |
|---|---|---|---|
| 95.33 | 98.07 | 1 hr | 150 |
| 95.33 | 98.13 | 30 min | 165 |
| 95.33 | 98.22 | 5 min | 212 |

It is obvious from Example III that relatively low temperatures may be utilized in digesting the sodium silicofluoride; however, it should be noted that if lower temperatures are to be used, it is necessary that the mixing time be increased as the digestion rate is a function of temperature. We have found the preferred temperature to be from about 175° F. to about 212° F. as at these temperatures the digestion will be complete in a minimum amount of time.

*Example IV*

To one part of dry, low grade $Na_2SiF_6$, one part of 8% $H_2SiF_6$ was added. This slurry was heated to 176° F. and mixed at this temperature for five minutes. The result in the following table shows the percent of dry, low grade sodium silicofluoride and the percent of sodium silicofluoride after the upgrading process.

Percent $Na_2SiF_6$
Dry low grade ------------------------------- 95.02
After upgrading ------------------------------ 98.68

Obviously, many modifications and variations of the invention as hereinbefore set forth may be made without departing from the spirit and scope thereof, and therefore only such limitations should be imposed as are indicated in the appended claims.

We claim:

1. The method of treating alkali metal silicofluoride produced as a by-product in the production of phosphoric acid from the acidification of phosphate rock which comprises: digesting low grade silicofluoride with an amount of hydrofluosilicic acid, to remove the impurities of said silicofluoride sufficiently to produce silicofluoride salts having a purity of at least 98%, at an elevated temperature to form a slurry of alkali metal silicofluoride in said acid; and separating the hot digested silicofluoride in the form of at least 98% pure salts.

2. A process for upgrading about 94–97% pure sodium silicofluoride produced as a by-product in the production of phosphoric acid from the acidification of phosphate rock which comprises: digesting the sodium silicofluoride with an amount of hydrofluosilicic acid, to remove the impurities of said sodium silicofluoride sufficiently to produce a product having a purity of at least 98%, at an elevated temperature to form a slurry of said silicofluoride in said acid; filtering the hot digested sodium silicofluoride, washing said sodium silicofluoride with water and drying said sodium silicofluoride whereby said at least 98% pure sodium silicofluoride product is produced.

3. In the production of silicofluoride from fluorine compounds contained in crude phosphoric acid from the acidification of phosphate rock, the improvement which comprises: admixing an alkaline precipitating agent with said crude phosphoric acid; separating the precipitated low grade silicofluoride in a slurry; digesting said silicofluoride slurry with hydrofluosilicic acid at an elevated temperature said hydrofluosilicic acid being present in an amount sufficient to dissolve impurities whereby silicofluoride salts having a purity of at least 98% are produced; and separating the hot digested silicofluoride in the form of at least 98% pure salts free of said acid containing impurities.

4. A process for upgrading low grade sodium silicofluoride produced as a by-product in the production of phosphoric acid from the acidification of phosphate rock which comprises: digesting said sodium silicofluoride with hydrofluosilicic acid at a temperature of from about 150° F. to about 212° F. for from about one hour to about five minutes, said hydrofluosilicic acid being present in an amount sufficient to dissolve impurities whereby sodium silicofluoride having a purity of at least 98% is produced; and separating the hot digested at least 98% pure sodium silicofluoride free of said acid containing impurities.

5. A process for the production of silicofluoride salts from fluorine compounds contained in crude phosphoric acid from the acidification of phosphate rock which comprises: adding an alkali metal precipitating agent to the crude phosphoric acid to precipitate a low grade silicofluoride; separating said silicofluoride in a slurry form; digesting said silicofluoride slurry with an amount of hydrofluosilicic acid, to dissolve impurities, sufficient to produce a digested silicofluoride having a purity of at least 98%, at a temperature of from about 150° F. to about 212° F. for about one hour to about five minutes; and separating the hot digested at least 98% pure silicofluoride.

6. A process for upgrading about 94–97% pure sodium silicofluoride produced as a by-product in the production of phosphoric acid from the acidification of phosphate rock which comprises: digesting said sodium silicofluoride with hydrofluosilicic acid at a temperature from about 175° F. to about 212° F. for from about ten minutes to about five minutes, said hydrofluosilicic acid being present in an amount sufficient to dissolve impurities whereby digested sodium silicofluoride salts having a purity of at least about 98% are produced; and separating the hot digested sodium silicofluoride in the form of at least 98% pure salts.

7. A process for the production of silicofluoride salts from fluorine compounds contained in crude phosphoric acid from the acidification of phosphate rock which comprises: adding an alkali metal precipitating agent to the crude phosphoric acid to precipitate an alkali metal silicofluoride having a purity of about 94–97%; separating said silicofluoride in a slurry form; digesting said silicofluoride slurry with hydrofluosilicic acid at a temperature of from about 175° F. to about 212° F. for from about ten minutes to about five minutes, said hydrofluosilicic acid being present in an amount sufficient to dissolve impurities whereby digested silicofluoride salts having a purity of at least 98% are produced; and separating the hot digested silicofluoride in the form of at least 98% pure salts.

References Cited in the file of this patent

UNITED STATES PATENTS

| 2,790,705 | Kean et al. | Apr. 30, 1957 |
| 2,853,363 | Sidun et al. | Sept. 23, 1958 |
| 2,952,516 | Gross | Sept. 13, 1960 |

FOREIGN PATENTS

| 357,922 | Great Britain | Oct. 1, 1931 |

OTHER REFERENCES

Mellor: "Comprehensive Treatise on Inorganic and Theoretical Chemistry," vol. 6 (1925), Longmans, Green and Co., London and New York, pages 948–954.